US008213508B2

(12) United States Patent
Boyce et al.

(10) Patent No.: US 8,213,508 B2
(45) Date of Patent: *Jul. 3, 2012

(54) COMPLEXITY SCALABLE VIDEO ENCODING

(75) Inventors: Jill MacDonald Boyce, Manalapan, NJ (US); Alexandros Michael Tourapis, Santa Clara, CA (US)

(73) Assignee: Thomson Licensing, Boulogne-Billcourt (FR)

( * ) Notice: Subject to any disclaimer, the term of this patent is extended or adjusted under 35 U.S.C. 154(b) by 1005 days.

This patent is subject to a terminal disclaimer.

(21) Appl. No.: 10/593,536

(22) PCT Filed: Mar. 31, 2005

(86) PCT No.: PCT/US2005/011359
§ 371 (c)(1),
(2), (4) Date: Aug. 21, 2008

(87) PCT Pub. No.: WO2005/099276
PCT Pub. Date: Oct. 20, 2005

(65) Prior Publication Data
US 2008/0304567 A1    Dec. 11, 2008

Related U.S. Application Data

(60) Provisional application No. 60/558,862, filed on Apr. 2, 2004.

(51) Int. Cl.
*H04N 7/12* (2006.01)
*G06K 9/36* (2006.01)

(52) U.S. Cl. .................................. 375/240.16; 382/236

(58) Field of Classification Search ............. 375/240.16, 375/240.24, 240, 240.27, 240.21; 382/236
See application file for complete search history.

(56) References Cited

U.S. PATENT DOCUMENTS

| | | | | |
|---|---|---|---|---|
| 5,262,854 A | * | 11/1993 | Ng ........................... | 375/240.24 |
| 6,504,872 B1 | * | 1/2003 | Fimoff et al. ............ | 375/240.27 |
| 7,170,932 B2 | * | 1/2007 | Vetro et al. .................... | 375/240 |
| 2005/0175099 A1 | * | 8/2005 | Sarkijarvi et al. ....... | 375/240.16 |
| 2007/0211798 A1 | | 9/2007 | Boyce | |

FOREIGN PATENT DOCUMENTS

JP    04177992    6/1992
(Continued)

OTHER PUBLICATIONS

Search Report dated Jan. 23, 2006.
(Continued)

*Primary Examiner* — Gims Philippe
(74) *Attorney, Agent, or Firm* — Robert D. Shedd; Paul P. Kiel; Xiaoan Lu

(57) ABSTRACT

A video decoder, a video decoding method, a video encoder and a video encoding method are disclosed. A video decoder for decoding a video bitstream for an image block includes a motion vector resolution reducer and a motion compensator. The motion vector resolution reducer is for receiving decoded high resolution motion vectors included in the video bitstream and for reducing an accuracy of the high resolution motion vectors to correspond to a low resolution. The motion compensator, in signal communication with the motion vector resolution reducer, is for forming a motion compensated high resolution prediction using the reduced accuracy motion vectors. The video encoder for encoding scalable video comprises a motion compensator for forming a motion compensated full resolution prediction and combining the motion compensated full resolution prediction from an image block to form a prediction residual. The prediction residual is downsampled to form a low resolution downsampled prediction residual and then coded.

6 Claims, 10 Drawing Sheets

FOREIGN PATENT DOCUMENTS

| | | |
|---|---|---|
| WO | WO 2005/093661 | 10/2005 |
| WO | WO 2005/099276 | 10/2005 |

OTHER PUBLICATIONS

Recommendation H.263: Video coding for low bit rate communication: ITU-T Draft Recommendation h.263, Feb. 1998 pp. 1-167, XP002176560 p. 129 paragraph Q1—p. 142, paragraph Q.7.2.

Ghanbari M.: "Standard Codecs: Image Compression to Advanced Video Coding. Chapter 8: Coding of high quality moving pictures (MPEG-2)" 2003, The IEE (The Institution of Electrical Engineers), London, UK XP002364049 ISBN: 0-85296-710-1 pp. 181-226.

Shin J. H. et al: Regularized Itarative Image Interpolation and its Application to Spartially Scalable Coding: IEEE Transactions on Consumer Electronics, IEEE Inc. New York, US vol. 44, No. 3, Aug. 1998,pp. 1042-1047, XP00851618.

Wells N D et al.: "Standardistation of Scalable Coding Schemes HDTV" IEE Colloquium on Digital Terrestrial Television, Nov. 10, 1993, pp. 6-1, XP006520125.

Tourapis, A. M. et al., "Reduced Resolution Update Mode for Advanced Video Coding." ITU-T Video Coding Experts Group (ITU-T SG 16 Q.6). Munich, Germany Mar. 15-19, 2004. p. 1-12.

\* cited by examiner

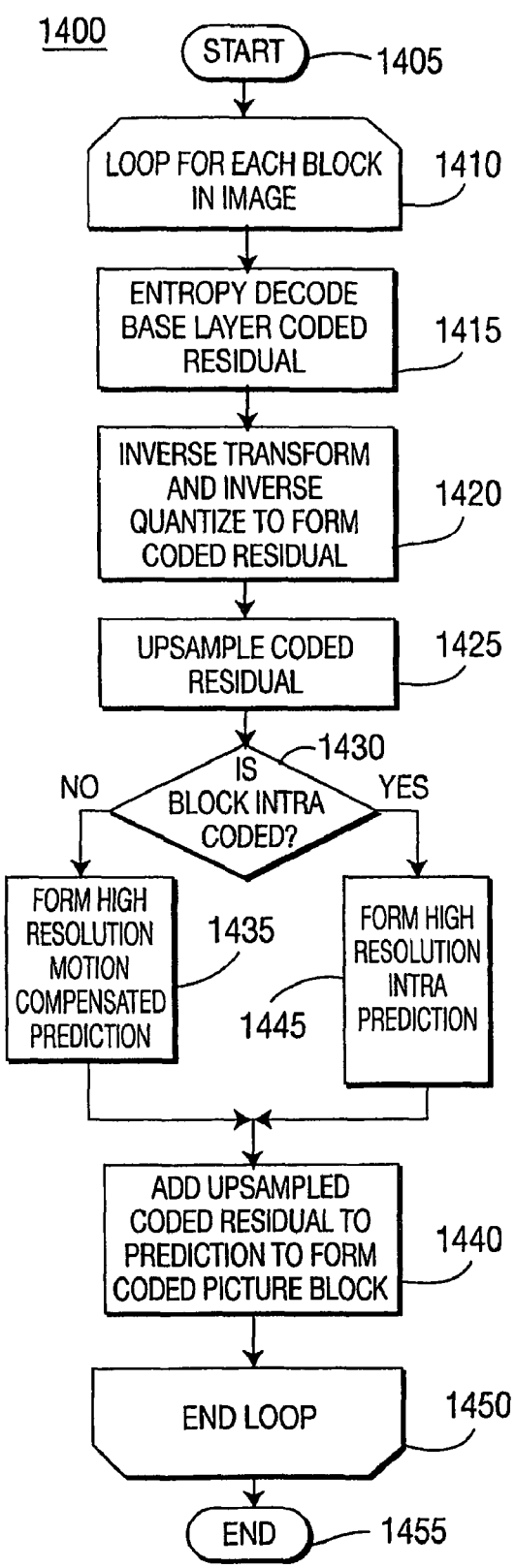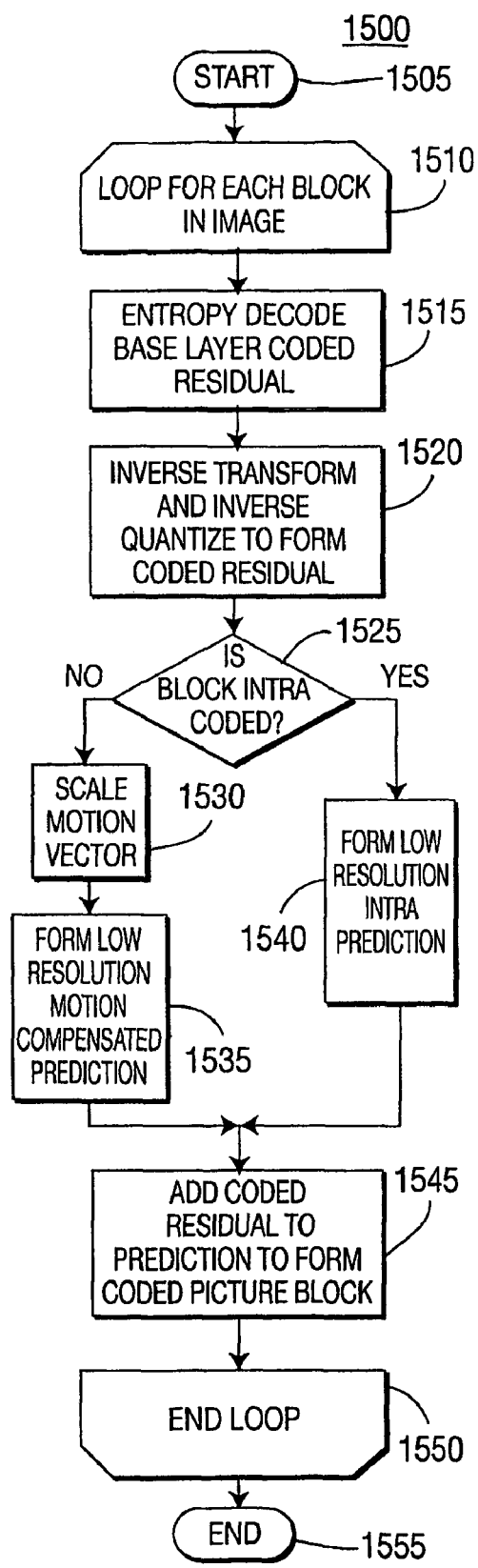
FIG. 14
FIG. 15

COMPLEXITY SCALABLE VIDEO ENCODING

CROSS-REFERENCE TO RELATED APPLICATIONS

This application claims the benefit, under 35 U.S.C. §365 of International Application PCT/US2005/011359, filed Mar. 31, 2005, which was republished in accordance with PCT Article 21(2) on Apr. 27, 2006, in English and which claims the benefit of U.S. provisional patent application No. 60/558, 862 filed Apr. 2, 2004. This application is also related to U.S. patent application Ser. No. 10/593,915 filed Sep. 22, 2006, entitled "Complexity Scalable Video Decoding," which is incorporated by reference herein in its entirety.

FIELD OF THE INVENTION

The present invention generally relates to video coders and decoders (CODECS) and, more particularly, to an apparatus and method for scalable complexity video coding and decoding.

BACKGROUND OF THE INVENTION

It is desirable for a broadcast video application to provide support for diverse user devices, without incurring the bitrate penalty of simulcast encoding. Video decoding is a complex operation, and the complexity is dependent on the resolution of the coded video. Low power portable devices typically have very strict complexity restrictions and low resolution displays. Simulcast broadcast of two or more video bitstreams corresponding to different resolutions can be used to address the complexity requirements of the lower resolution devices, but requires a higher total bitrate than a complexity scalable system. Accordingly, there is a need for a solution that allows for complexity scalable CODECs while maintaining high video coding bitrate efficiency.

Many different methods of scalability have been widely studied and standardized, including SNR scalability, spatial scalability, temporal scalability, and fine grain scalability, in scalability profiles of the MPEG-2 and MPEG-4 standards. Most of the work in scalable coding has been aimed at bitrate scalability, where the low resolution layer has a limited bandwidth. As shown in FIG. 1, a typical spatial scalability system is indicated generally by the reference numeral 100. The system 100 includes a complexity scalable video encoder 110 for receiving a video sequence. A first output of the complexity scalable video encoder 110 is connected in signal communication with a low-bandwidth network 120 and with a first input of a multiplexer 130. A second output of the complexity scalable video encoder 110 is connected in signal communication with a second input of the multiplexer 130. An output of the low bandwidth network 120 is connected in signal communication with an input of a low resolution decoder 140. An output of the multiplexer 130 is connected in signal communication with an input of a high bandwidth network 150. An output of the high bandwidth network 150 is connected in signal communication with an input of a demultiplexer 160. A first output of the demultiplexer 160 is connected in signal communication with a first input of a high resolution decoder 170, and a second output of the demultiplexer 160 is connected in signal communication with a second input of the high resolution decoder 170. Outputs of the low resolution decoder 140 and the high resolution decoder 170 are available externally from the system 100.

Scalable coding has not been widely adopted in practice, because of the considerable increase in encoder and decoder complexity, and because the coding efficiency of scalable encoders is typically well below that of non-scalable encoders.

Spatially scalable encoders and decoders typically require that the high resolution scalable encoder/decoder provide, additional functionality than would be present in a normal high resolution encoder/decoder. In an MPEG-2 spatial scalable encoder, a decision is made whether prediction is performed from a low resolution reference picture or from a high resolution reference picture. An MPEG-2 spatial scalable decoder must be capable of predicting either from the low resolution reference picture or the high resolution reference picture. Two sets of reference picture stores are required by an MPEG-2 spatial scalable encoder/decoder, one for low resolution pictures and another for high resolution pictures. FIG. 2 shows a block diagram for a low-complexity spatial scalable encoder 200 supporting two layers, according to the prior art. FIG. 3 shows a block diagram for a low-complexity spatial scalable decoder 300 supporting two layers, according to the prior art.

Turning to FIG. 2, a spatial scalable video encoder supporting two layers is indicated generally by the reference numeral 200. The video encoder 200 includes a downsampler 210 for receiving a high-resolution input video sequence. The downsampler 210 is coupled in signal communication with a low-resolution non-scalable encoder 212, which, in turn, is coupled in signal communication with low-resolution frame stores 214. The low-resolution non-scalable encoder 212 outputs a low-resolution bitstream, and is further coupled in signal communication with a low-resolution non-scalable decoder 220.

The low-resolution non-scalable decoder 220 is coupled in signal communication with an upsampler 230, which, in turn, is coupled in signal communication with a scalable high-resolution encoder 240. The scalable high-resolution encoder 240 also receives the high-resolution input video sequence, is coupled in signal communication with high-resolution frame stores 250, and outputs a high-resolution scalable bitstream.

Thus, a high resolution input video sequence is received by the low-complexity encoder 200 and down-sampled to create a low-resolution video sequence. The low-resolution video sequence is encoded using a non-scalable low-resolution video compression encoder, creating a low-resolution bitstream. The low-resolution bitstream is decoded using a non-scalable low-resolution video compression decoder. This function may be performed inside of the encoder. The decoded low-resolution sequence is up-sampled, and provided as one of two inputs to a scalable high-resolution encoder. The scalable high-resolution encoder encodes the video to create a high-resolution scalable bitstream.

Turning to FIG. 3, a spatial scalable video decoder supporting two layers is indicated generally by the reference numeral 300. The video decoder 300 includes a low-resolution decoder 360 for receiving a low-resolution bitstream, which is coupled in signal communication with low-resolution frame stores 362, and outputs a low-resolution video sequence. The low-resolution decoder 360 is further coupled in signal communication with an upsampler 370, which, in turn, is coupled in signal communication with a scalable high-resolution decoder 380.

The scalable high-resolution decoder 380 is further coupled in signal communication with high-resolution frame stores 390. The scalable high-resolution decoder 380 receives a high-resolution scalable bitstream and outputs a high-resolution video sequence.

Thus, both a high-resolution scalable bitstream and low-resolution bitstream are received by the low-complexity decoder 300. The low-resolution bitstream is decoded using a non-scalable low-resolution video compression decoder, which utilizes low-resolution frame stores. The decoded low-resolution video is up-sampled, and then input into a high-resolution scalable decoder. The high-resolution scalable decoder utilizes a set of high-resolution frame stores, and creates the high-resolution output video sequence.

Turning to FIG. 4, a non-scalable video encoder is indicated generally by the reference numeral 400. An input to the video encoder 400 is connected in signal communication with a non-inverting input of a summing junction (adder or other means for signal combination/comparison) 410. The output of the summing junction 410 is connected in signal communication with a transformer/quantizer 420. The output of the transformer/quantizer 420 is connected in signal communication with an entropy coder 440, where the output of the entropy coder 440 is an externally available output of the encoder 400.

The output of the transformer/quantizer 420 is further connected in signal communication with an inverse transformer/quantizer 450. An output of the inverse transformer/quantizer 450 is connected in signal communication with a first non-inverting input of a summing junction (adder or other means for signal combination) 488. An output of the summing junction 488 is connected in signal communication with an input of a deblock filter 460. An output of the deblock filter 460 is connected in signal communication with reference picture stores 470. A first output of the reference picture stores 470 is connected in signal communication with a first input of a motion estimator 480. The input to the encoder 400 is further connected in signal communication with a second input of the motion estimator 480. The output of the motion estimator 480 is connected in signal communication with a first input of a motion compensator 490. A second output of the reference picture stores 470 is connected in signal communication with a second input of the motion compensator 490. The output of the motion compensator 490 is connected in signal communication with an inverting input of the summing junction 410 and with a second non-inverting input of the summing junction 488.

Turning to FIG. 5, a non-scalable video decoder is indicated generally by the reference numeral 500. The video decoder 500 includes an entropy decoder 510 for receiving a video sequence. A first output of the entropy decoder 510 is connected in signal communication with an input of an inverse quantizer/transformer 520. An output of the inverse quantizer/transformer 520 is connected in signal communication with a first input of a summing junction (adder or other means for signal combination/comparison) 540.

The output of the summing junction 540 is connected in signal communication with a deblocking filter 590. An output of the deblocking filter 590 is connected in signal communication with reference picture stores 550. The reference picture stores 550 is connected in signal communication with a first input of a motion compensator 560. An output of the motion compensator 560 is connected in signal communication with a second input of the summing junction 540. A second output of the entropy decoder 510 is connected in signal communication with a second input of the motion compensator 560. The output of the de blocking filter 590 provides the output of the video decoder 500.

It has been proposed that H.264/MPEG AVC be extended to use a Reduced Resolution Update (RRU) mode. The RRU mode improves coding efficiency at low bitrates by reducing the number of residual macroblocks (MBs) to be coded, while performing motion estimation and compensation of full resolution pictures. Turning to FIG. 6, a Reduced Resolution Update (RRU) video encoder is indicated generally by the reference numeral 600. An input to the video encoder 600 is connected in signal communication with a non-inverting input of a summing junction (adder or other means for signal combination/comparison) 610. The output of the summing junction 610 is connected in signal communication with an input of a downsampler 612. An input of a transformer/quantizer 620 is connected in signal communication with an output of the downsampler 612 or with the output of the summing junction 610. An output of the transformer/quantizer 620 is connected in signal communication with an entropy coder 640, where the output of the entropy coder 640 is an externally available output of the encoder 600.

The output of the transformer/quantizer 620 is further connected in signal communication with an input of an inverse transformer/quantizer 650. An output of the inverse transformer/quantizer 650 is connected in signal communication with an input of an upsampler 655. A first non-inverting input of an adder (summing junction or other signal combining means) 688 is connected in signal communication with an output of the inverse transformer/quantizer 650 or with an output of the upsampler 655. An output of the adder 688 is connected in signal communication with an input of a deblocking filter 660. An output of the deblocking filter 660 is connected in signal communication with an input of reference picture stores 670. A first output of the reference picture stores 670 is connected in signal communication with a first input of a motion estimator 680. The input to the encoder 600 is further connected in signal communication with a second input of the motion estimator 680. The output of the motion estimator 680 is connected in signal communication with a first input of a motion compensator 690. A second output of the reference picture stores 670 is connected in signal communication with a second input of the motion compensator 690. The output of the motion compensator 690 is connected in signal communication with an inverting input of the summing junction 610 and with a second non-inverting input of the adder 688.

Turning to FIG. 7, a Reduced Resolution Update (RRU) video decoder is indicated generally by the reference numeral 700. The video decoder 700 includes an entropy decoder 710 for receiving a video sequence. An output of the entropy decoder 710 is connected in signal communication with an input of an inverse quantizer/transformer 720. An output of the inverse quantizer/transformer 720 is connected in signal communication with an input of an upsampler 722. An output of the upsampler 722 is connected in signal communication with a first input of a summing junction (adder or other means for signal combination/comparison) 740.

An output of the summing junction 740 is connected in signal communication with full resolution reference picture stores 750 and with a deblocking filter 790. The full resolution reference picture stores 750 is connected in signal communication with a motion compensator 760, which is connected in signal communication with a second input of the summing junction 740. An output of the deblocking filter 790 provides the output of the video decoder 700.

SUMMARY OF THE INVENTION

These and other drawbacks and disadvantages of the prior art are addressed by the present invention, which is directed to an apparatus and method for scalable complexity video coding and decoding.

According to an aspect of one embodiment of the present invention, there is provided a method for encoding scalable video comprising the steps of: forming a motion compensated full resolution prediction; combining the motion compensated full resolution prediction from an image block to form a prediction residual; downsampling the prediction residual to form a low resolution downsampled prediction residual; and coding the low resolution downsampled prediction residual.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 14 shows a flow diagram for a high resolution video decoding process in accordance with the principles of the present invention;

FIG. 15 shows a flow diagram for a low resolution video decoding process in accordance with the principles of the present invention.

DETAILED DESCRIPTION OF PREFERRED EMBODIMENTS

Figure 1:
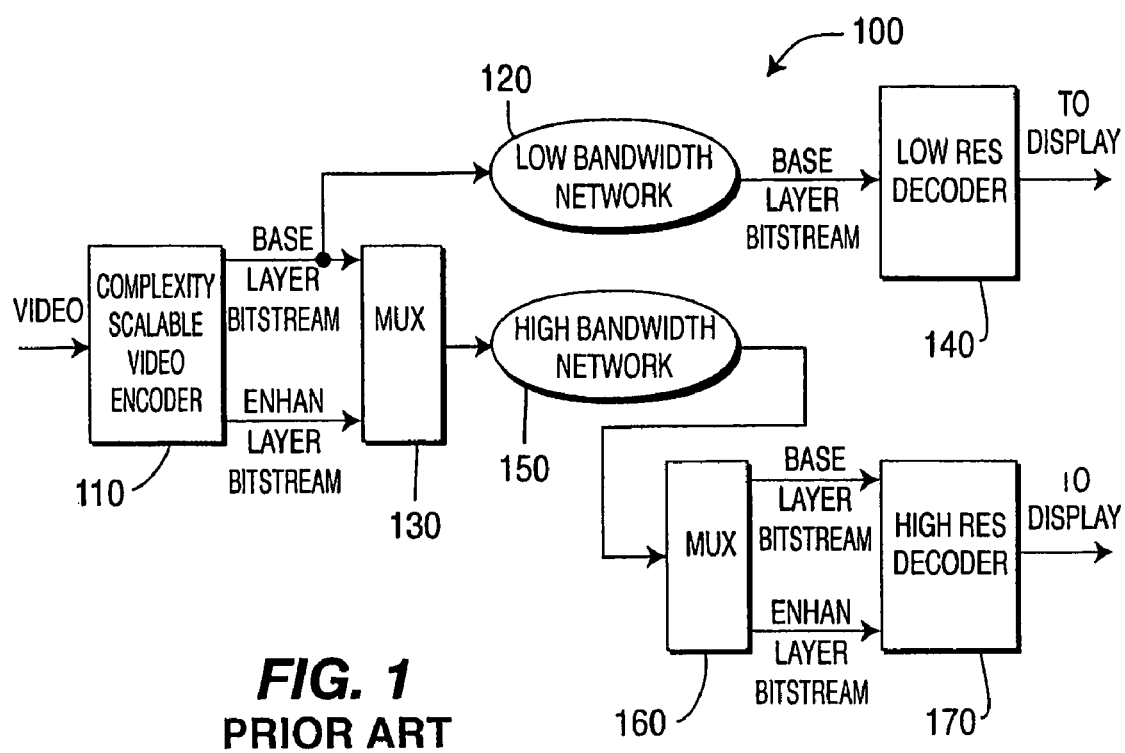
FIG. 1 shows a block diagram for a typical spatial scalability system, according to the prior art.
Figure 2:
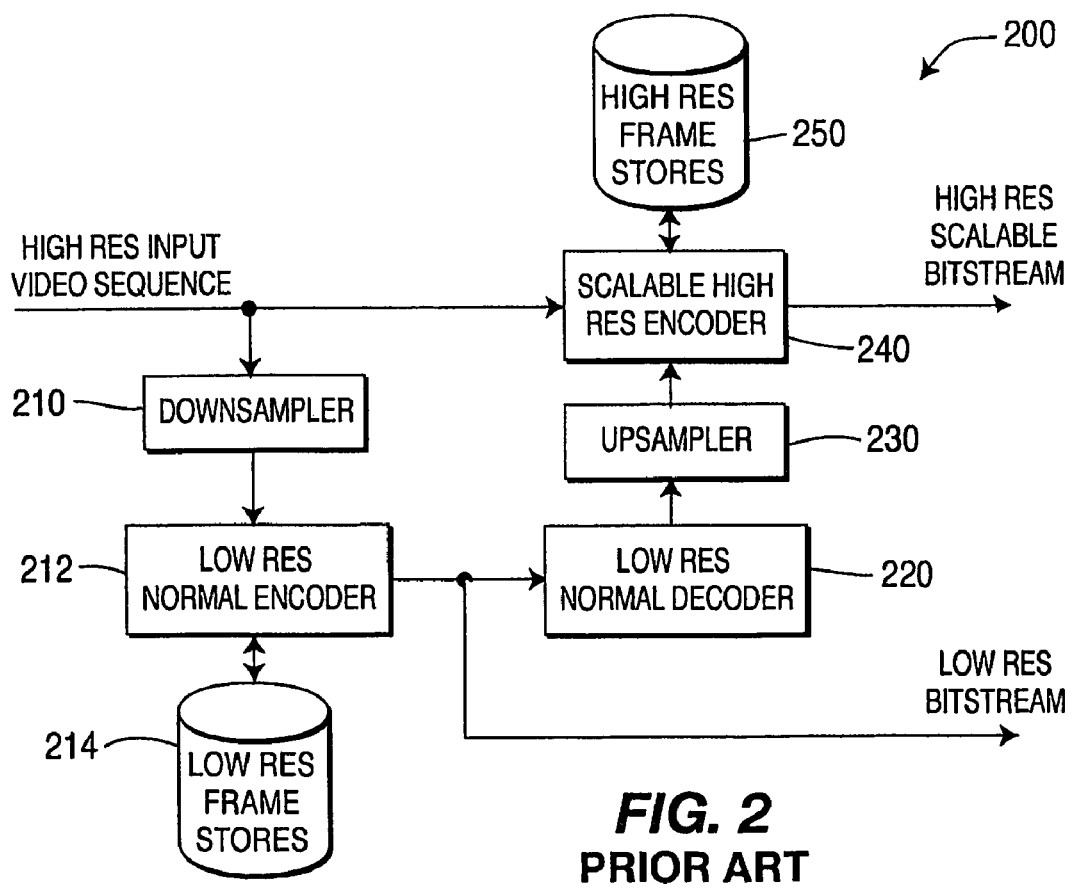
FIG. 2 shows a block diagram for a spatial scalable encoder supporting two layers, according to the prior art.

The present invention is directed to an apparatus and method for scalable complexity video coding and decoding.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional/language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs, that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

The present invention is useful in that it enables a broadcast video system with diverse user endpoint devices, while maintaining coding efficiency. Without loss in generality, consider a system that supports at least two different levels of decoder complexity and resolution. A low resolution decoder has a smaller display size and has very strict decoder complexity constraints. A full resolution decoder has a larger display size and less strict but still important decoder complexity constraints.

Figure 8:
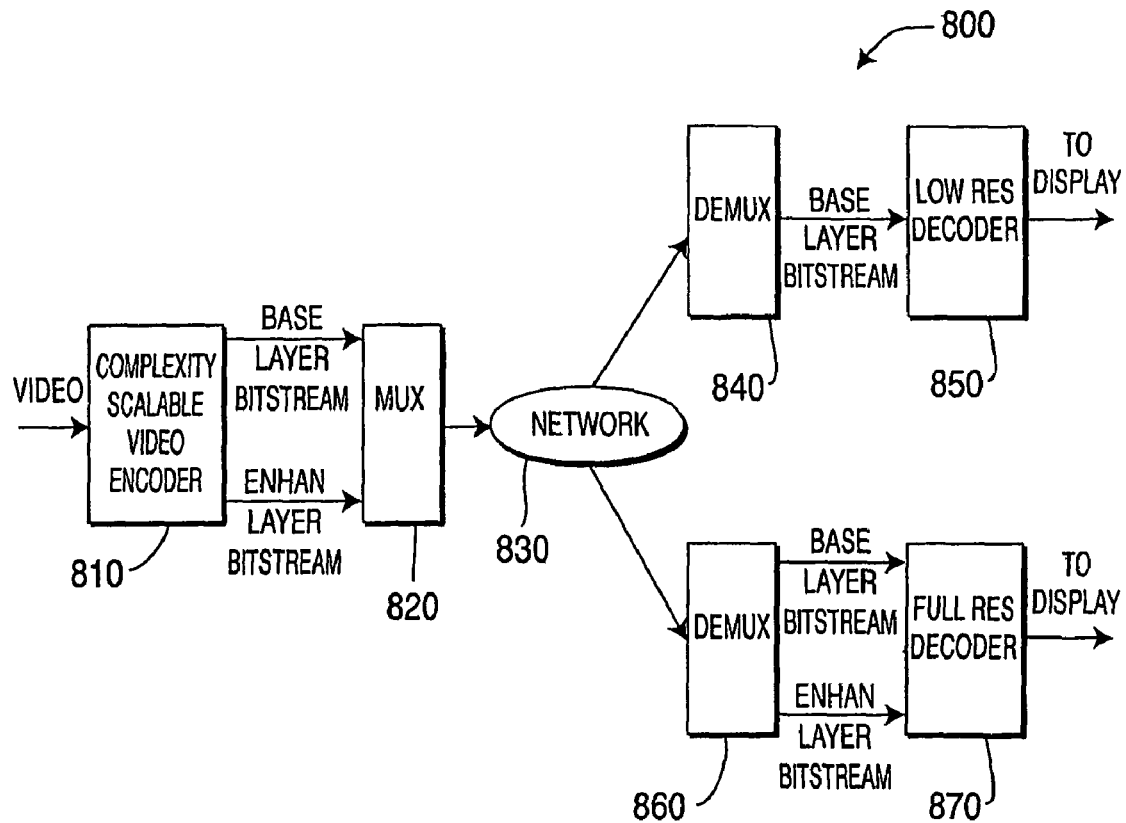
FIG. 8 shows a block diagram for a complexity scalability broadcast system in accordance with the principles of the present invention.

A broadcast or multicast system transmits two bitstreams, a base layer with bitrate $BR_{base}$ and an enhancement layer with bitrate $BR_{enhan}$. The two bitstreams may be multiplexed together and sent in a single transport stream. Turning to FIG. 8, a complexity scalability broadcast system is indicated generally by the reference numeral 800. The system 800 includes a complexity scalable video encoder and a low resolution decoder and a full resolution decoder, in accordance with the principles of the present invention. The complexity scalability broadcast system 800 includes a complexity scalable video encoder 810. A first output of the complexity scalable video encoder 810 is connected in signal communication with a first input of a multiplexer 820. A second output of the complexity scalable video encoder 810 is connected in signal communication with a second input of the multiplexer 820. An output of the multiplexer 820 is connected in signal communication with a network 830. An output of the network 830 is connected in signal communication with an input of a first demultiplexer 840 and with an input of a second demultiplexer 850. An output of the first demultiplexer 840 is connected in signal communication with an input of a low resolution decoder 850. A first output of the second demultiplexer 860 is connected in signal communication with a first input of a full resolution decoder 870. A second output of the second demultiplexer 860 is connected in signal communication with a second input of the full resolution decoder 870. The low resolution decoder 850 processes only the base layer bitstream and the full resolution decoder 870 processes both the base layer bitstream and the enhancement layer bitstream.

A key goal of this system is to minimize $BR_{base}+BR_{enhan}$. This differs somewhat from a typical scalability system where minimizing $BR_{base}$ itself is also considered important, as shown in FIG. 1 where the low resolution devices are connected via a low bandwidth network. In the complexity scalability system 800, it is assumed that both the base layer and the enhancement layer are broadcast, so the bitrate of the base layer bitstream is not as highly constrained.

In the present invention, the bits used for coding of the video residual formed after motion estimation/compensation are used in both the low resolution decoder 850 and the full resolution decoder 870. The motion vectors (mvs) transmitted in the base layer bitstream are used in both the low resolution decoder 850 and the full resolution decoder 870, but with a higher accuracy in the full resolution decoder 870 than in the low resolution decoder 850. Also, the motion compensation prediction is done at a low resolution in the low resolution decoder 850 and at a high resolution in the high resolution decoder 870. The motion blocks at the low resolution correspond to larger blocks at the high resolution. So, when applied to the H.264/MPEG AVC codec, for example, the allowable motion block sizes of 16×16, 16×8, 8×16, 8×8, 8×4, 4×8 and 4×4 are used in the low resolution base layer, but correspond to larger block sizes of 32×32, 32×16, 16×32, 16×16, 16×8, 8×16, and 8×8 at the full resolution.

The low resolution decoder 850 uses only the base layer bitstream. An additional enhancement layer bitstream is also transmitted, e.g., using 16×16 macroblocks, for use in the full resolution decoder 870. The enhancement layer bitstream includes a full resolution error signal, to be added to the result of decoding of the base layer bitstream, which was done with full resolution motion compensation. The bitrate of the enhancement layer may end up being lower than that of the base layer, which differs from the typical spatial scalability case where the base layer bitrate is typically small compared with the enhancement layer bitrate. A full resolution error signal is not necessarily sent for every coded macroblock or slice/picture.

Figure 9:
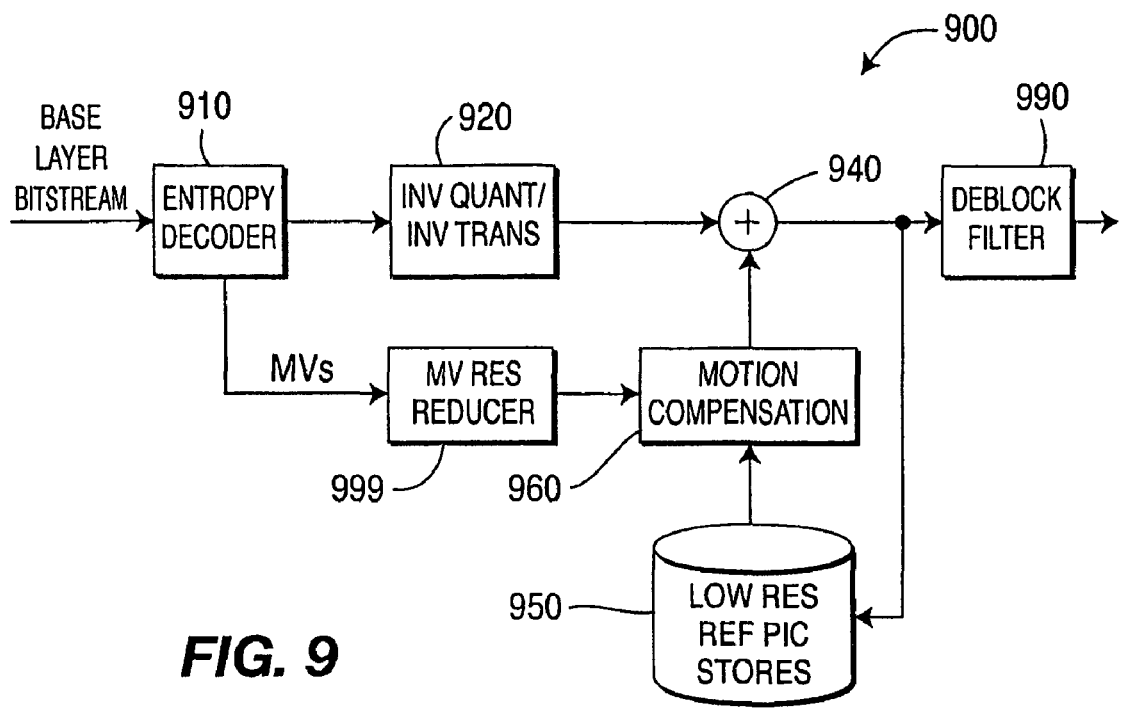
FIG. 9 shows a block diagram for a low resolution complexity scalable video decoder in accordance with the principles of the present invention.

Turning to FIG. 9, a low resolution complexity scalable video decoder is indicated generally by the reference numeral 900. The video decoder 900 includes an entropy decoder 910 for receiving a video sequence. A first output of the entropy decoder 910 is connected in signal communication with an input of an inverse quantizer/transformer 920. An output of the inverse quantizer/transformer 920 is connected in signal communication with a first input of a summing junction (adder or other means for signal combination/comparison) 940.

The output of the summing junction 940 is connected in signal communication with reference picture stores 950 and with a deblocking filter 990. The reference picture stores 950 is connected in signal communication with a first input of a motion compensator 960. An output of the motion compensator 960 is connected in signal communication with a second input of the summing junction 940. A second output of the entropy decoder 910 is connected in signal communication with an input of a motion vector (MV) resolution reducer 999. An output of the MV resolution reducer 999 is connected in signal communication with a second input of the motion compensator 960. An output of the deblocking filter 990 provides the output of the video decoder 900.

The base layer bitstream is entropy decoded by the entropy decoder 910. The motion vectors are rounded by the motion vector resolution reducer 999 to reduce the accuracy of the motion vectors to correspond to the low resolution. The remaining blocks are similar to those found in a standard video decoder, including inverse quantization and inverse transform, motion compensation, and deblocking filter. The complexity of the low resolution scalable decoder 900 is very similar to that of a non-scalable decoder, as scaling of motion vectors is of very low complexity. If factors of 2 are used in the resolution ratios in each dimension between the low and full resolution, the rounding can be implemented with just a right shift or an add and a right shift, depending whether rounding up or rounding down is selected in the system.

In an alternative embodiment of the present invention, the motion vectors transmitted in the base layer are not of the higher resolution. In this case, the low resolution decoder can be completely backwards compatible with an existing coding standard. However, such a system may be of lower coding efficiency as the additional bit accuracy of the motion vectors for the full resolution must be transmitted in the enhancement layer bitstream. In this case, the enhancement layer could be coded similar to a P slice, and motion vectors are differentially coded first based on layer prediction (e.g., differentially coded versus the corresponding low resolution layer mv), and secondly using spatial prediction (e.g., differentially coded versus adjacent mvs or even versus adjacent differential mvs).

Figure 10:
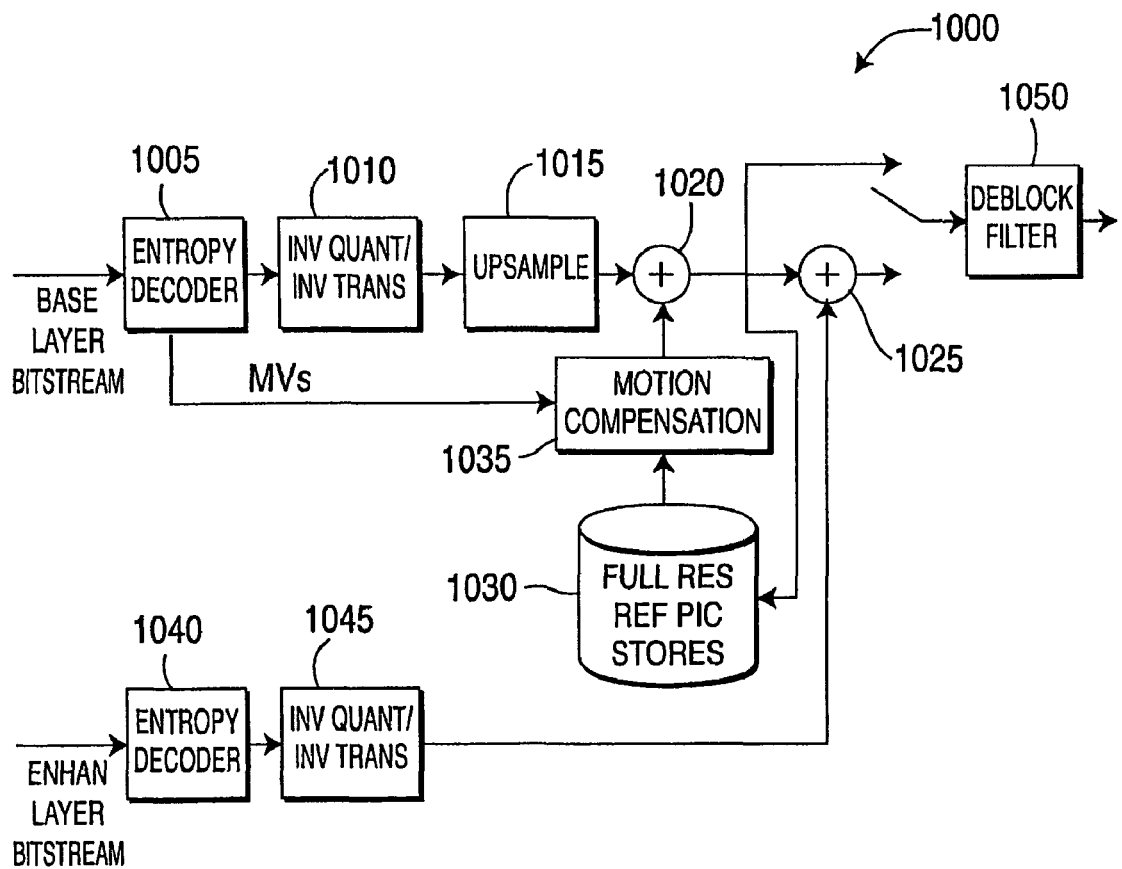
FIG. 10 shows a block diagram for a high resolution complexity scalable video decoder in accordance with the principles of the present invention.

Turning to FIG. 10, a high resolution complexity scalable video decoder 1000 is indicated generally by the reference numeral 1000. The video decoder 1000 includes a first entropy decoder 1005 for receiving a base layer bitstream. An output of the first entropy decoder 1005 is connected in signal communication with an input of a first inverse quantizer/transformer 1010. An output of the first inverse quantizer/transformer 1010 is connected in signal communication with an input of an upsampler 1015. An output of the upsampler 1015 is connected in signal communication with a first input of a first summing junction (adder or other means for signal combination/comparison) 1020.

An output of the first summing junction 1020 is connected in signal communication with a first input of a second summing junction (adder or other means for signal combination/comparison) 1025. An output of a full resolution reference picture stores 1030 is connected in signal communication with a first input of a motion compensator 1035. A second output of the entropy decoder 1005 is connected in signal communication with a second input of the motion compensator 1035. An output of the motion compensator 1035 is connected in signal communication with a second input of the first summing junction 1020.

An input of a second entropy decoder 1040 is for receiving an enhanced layer bitstream. An output of the second entropy decoder 1040 is connected in signal communication with an input of a second inverse quantizer/transformer 1045. An output of the second inverse quantizer/transformer 1045 is connected in signal communication with a second input of the second summing junction 1025.

An input to a deblocking filter 1050 is connected in signal communication with an input of full resolution reference picture stores 1030 or with an output of the second summing junction 1025. An output of the deblocking filter 1050 provides the output of the video decoder 1000.

The portion of the decoder 1000 that operates on the base layer bitstream is similar to an RRU decoder. After entropy decoding and inverse quantization and inverse transform, the residual is upsampled. Motion compensation is applied to the full resolution reference pictures to form a full resolution prediction, and the upsampled residual is added to the prediction. If a full resolution error signal is present in the enhancement layer bitstream, it is entropy decoded and inversed quantized and transformed, and then added to the RRU reconstructed signal. The deblocking filter is then applied. Presence of full resolution error signal could be signaled at the macroblock level with the use of a Skip macroblock mode. If a macroblock is marked as skipped no additional error signal is present, while if not, the delta_quant, the coded block pattern and the actual residual have to also be transmitted. Skip macroblocks could also be run-length coded to further increase efficiency. An additional intra directional prediction mode may be created that performs no directional prediction. Although it may be more efficient to not perform any additional prediction if a macroblock in the enhancement layer is skipped, additional prediction could also be inferred by considering adjacent macroblocks. For example, if all intra prediction modes as described in H.264 are available, then an additional prediction for skip could also be generated which can be derived from the prediction modes of the adjacent macroblocks (i.e. minimum directional prediction) which is then added to the RRU reconstructed signal to generate the final prediction. Similarly, an additional direct intra mode could also be used which could also derive its directional prediction mode from adjacent macroblocks, while still allowing the transmission of an error signal.

Figure 3:
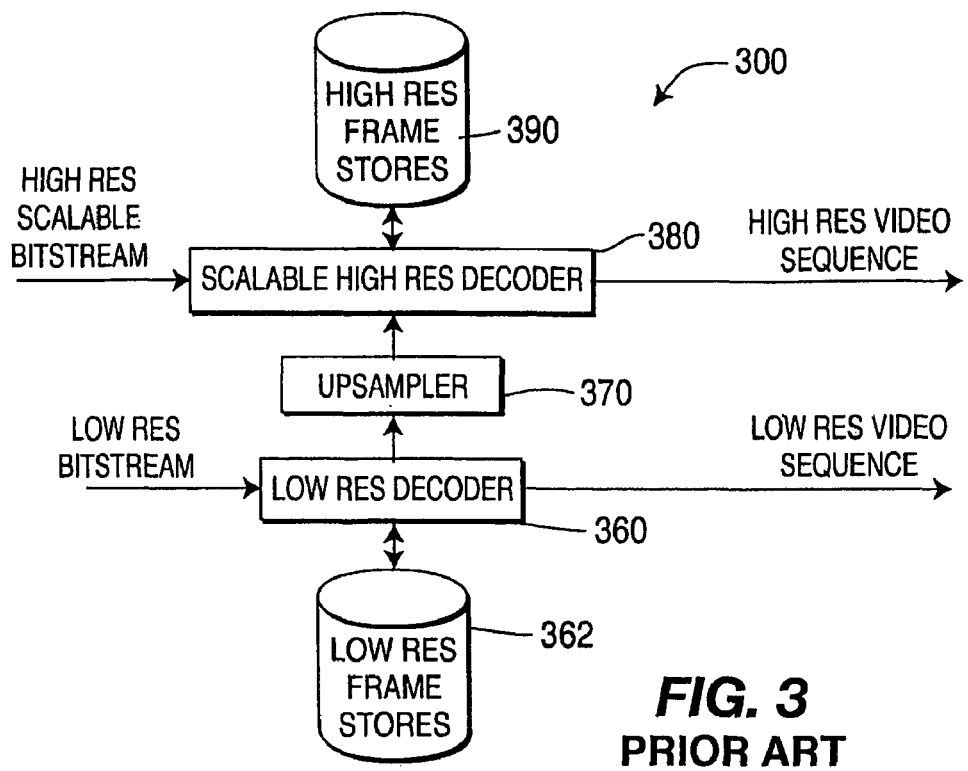
FIG. 3 shows a block diagram for a spatial scalable decoder supporting two layers, according to the prior art.
Figure 4:
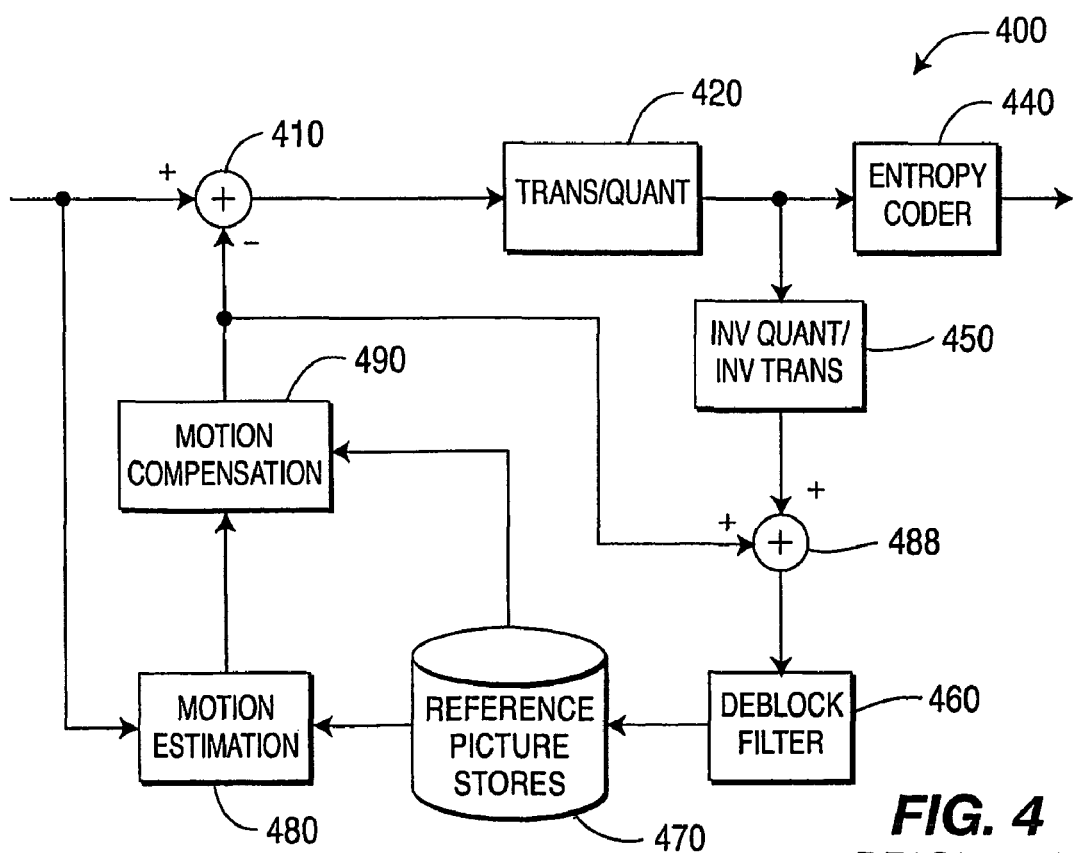
FIG. 4 shows a block diagram for a normal non-scalable video encoder used in the H.264/MPEG. AVC standard, according to the prior art.
Figure 5:
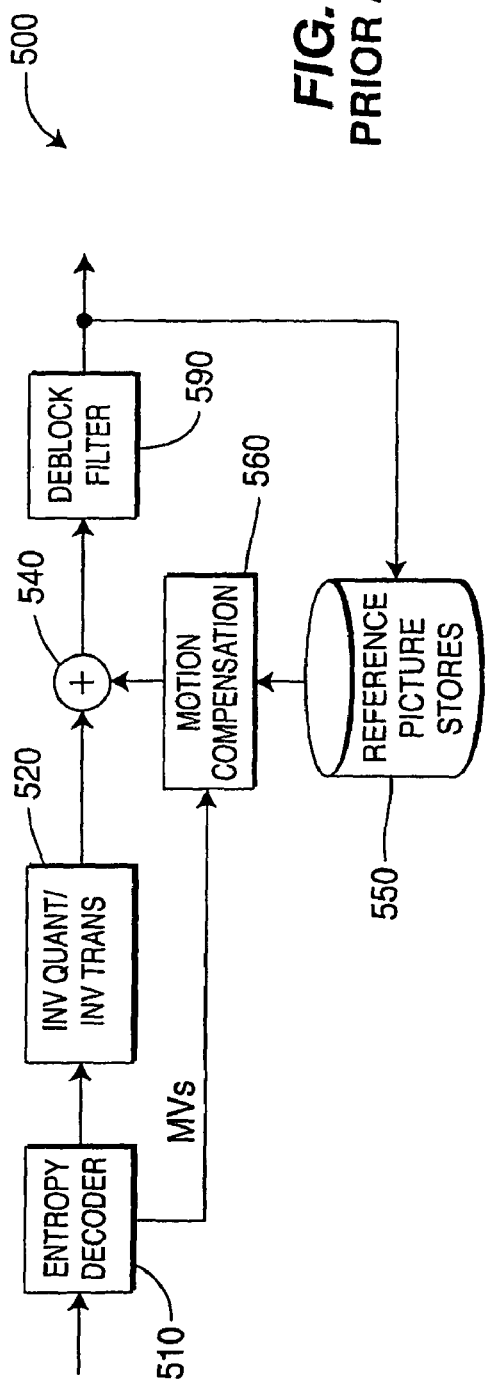
FIG. 5 shows a block diagram for a normal non-scalable video decoder used with H.264/MPEG AVC, according to the prior art.
Figure 6:
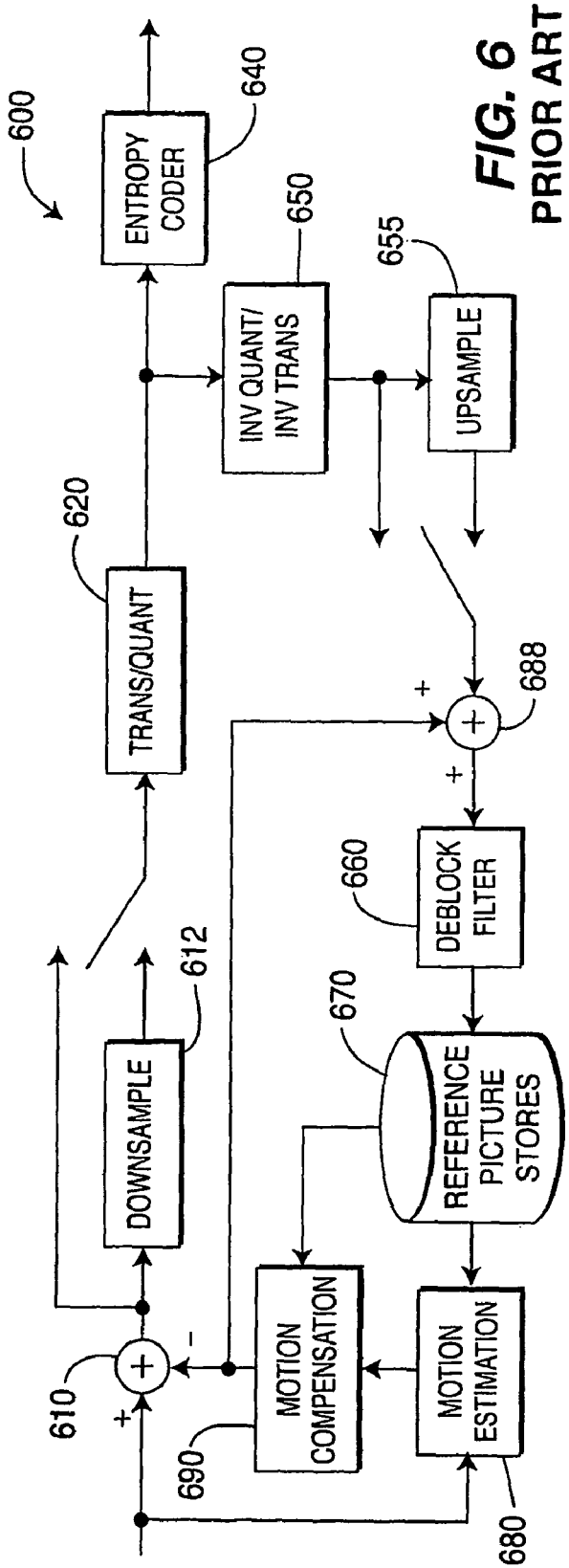
FIG. 6 shows a block diagram for a Reduced Resolution Update (RRU) video encoder, according to the prior art.
Figure 7:
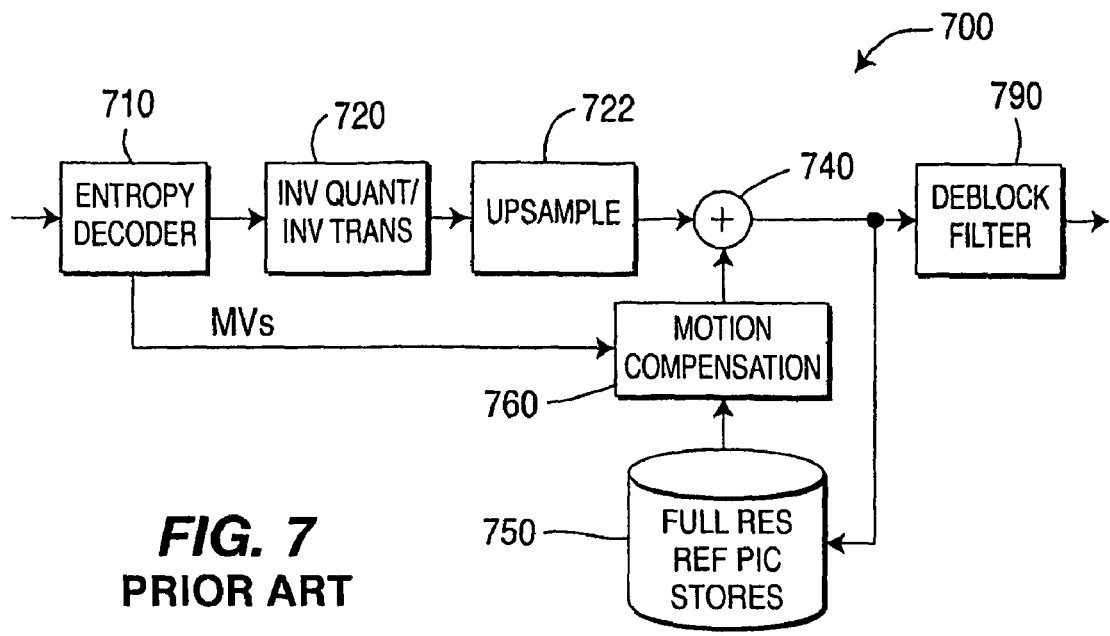
FIG. 7 shows a block diagram for a Reduced Resolution Update (RRU) video decoder, according to the prior art.

A key difference in this architecture from a traditional spatial scalable decoder is that there is no need for two sets of reference pictures stores and motion compensation units. This full resolution decoder contains only full resolution reference pictures stores and only performs motion compensation once at the full resolution. In contrast, the spatial scalability decoder of FIG. 3 includes both full resolution and low resolution reference pictures stores, and performs motion compensation at both the full resolution and the low resolution. This leads to a significant reduction in computations, memory, and memory bandwidth for full resolution decoders in accordance with this invention as compared to traditional spatial scalable decoders.

The decoder complexity of the full resolution scalable decoder is similar to that of a normal video decoder of the same resolution. The inverse quantization and inverse transform blocks for the base layer bitstream are of lower complexity, as they operate on few blocks that a normal decoder. However, additional entropy decoding and inverse quantization and inverse transform is required for the enhancement layer bitstream. The motion compensation and the deblocking filter, which are the most computationally complex blocks of a decoder, are unchanged from a normal decoder.

In an embodiment of the present invention, an enhancement layer bitstream full resolution error signal is only sent when intra-coded (I) slices are present in the base layer. Limiting the use of the enhancement layer for only I slices limits the decoder complexity for software implementations. I slices generally require fewer computations than P and B slices, and hence there should be spare CPU cycles available for the additional entropy decode and inverse quantization and inverse transform operations.

Figure 11:
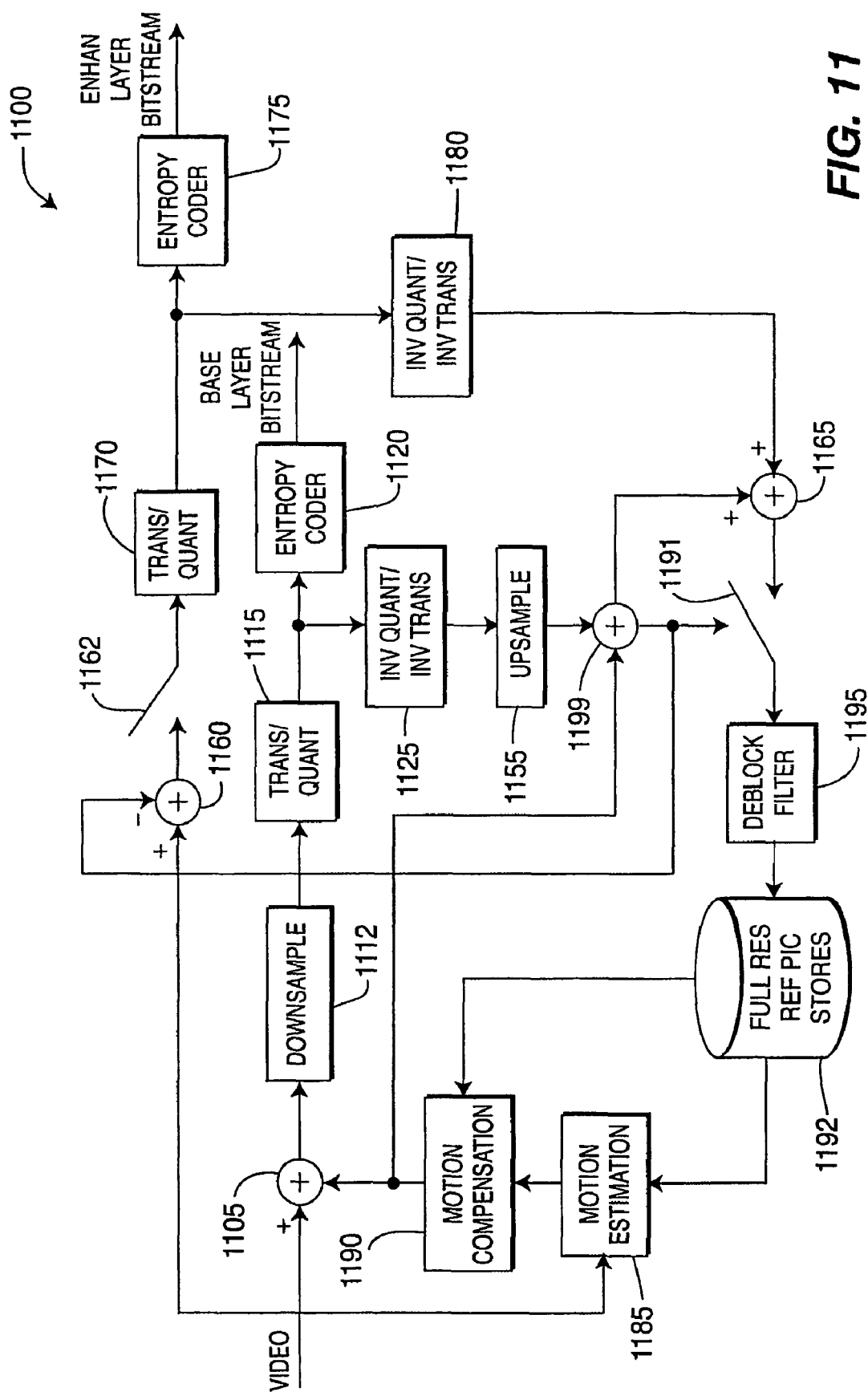
FIG. 11 shows a block diagram for a complexity scalable video encoder in accordance with the principles of the present invention.

Turning to FIG. 11, a complexity scalable video encoder is indicated generally by the reference numeral 1100. An input to the video encoder 1100 is connected in signal communication with a non-inverting input of a first summing junction (adder or other means for signal combination/comparison) 1105. The output of the first summing junction 1105 is connected in signal communication with an input of a downsampler 1112. An output of the downsampler 1112 is connected in signal communication with an input of a first transformer/quantizer 1115. An output of the first transformer/quantizer 1115 is connected in signal communication with an input of a first entropy coder 1120, where the output of the first entropy coder 1120 is an externally available output of the encoder 1100 for a base layer bitstream.

The output of the first transformer/quantizer 1115 is further connected in signal communication with an input of a first inverse transformer/quantizer 1125. An output of the first inverse transformer/quantizer 1125 is connected in signal communication with an input of an upsampler 1155. An output of the upsampler 1155 is connected in signal communication a first input of a third summing junction (adder or other means for signal combination/comparison) 1199. A first output of the third summing junction 1199 is connected in signal communication with a first non-inverting input of a second summing junction (adder or other means for signal combination/comparison) 1160 and with an input of a switch 1191. A second output of the third summing junction 1199 is connected in signal communication with a first non-inverting input of a third summing junction 1165.

The input to the video encoder 1100 is further connected in signal communication with a non-inverting input of a second summing junction 1160. An output of the second summing junction 1160 is connected in signal communication with an input of a switch 1162. An output of the switch 1162 is connected in signal communication with an input to a second transformer/quantizer 1170. An output of the second transformer/quantizer 1170 is connected in signal communication with an input of a second entropy coder 1175, where the output of the second entropy coder 1175 is an externally available output of the encoder 1100 for an enhanced layer bitstream. The output of the second transformer/quantizer 1170 is further connected in signal communication with an input of a second inverse transformer/quantizer 1180. An output of the second inverse transformer/quantizer 1180 is connected in signal communication with a second non-inverting input of the third summing junction 1165.

The input to the video encoder 1100 is yet further connected in signal communication with a first input of a motion estimator 1185. An output of the motion estimator 1185 is connected in signal communication with a first input of a motion compensator 1190. An output of the motion compensator 1190 is connected in signal communication with an inverting input of the first summing junction 1105 and with a second input of the third summing junction 1199. A first output of a full resolution reference picture stores 1192 is connected in signal communication with a second input of the motion estimator 1185. A second output of the full resolution reference picture stores 1192 is connected in signal communication with a second input of the motion compensator 1190. An input of the full resolution reference picture stores 1192 is connected in signal communication with an output of a deblocking filter 1195. An input of the deblock filtering 1195 is connected in signal communication with an output of the switch 1191. Another input of the switch 1191 is connected in signal communication with an output of the third summing junctions 165.

The encoder 1100 attempts to optimize the full resolution video quality rather than the low resolution video quality. Motion estimation is performed on the full resolution video picture. After subtraction the motion compensated prediction from the input picture, the prediction residual is downsampled. Unlike in the RRU codec, the downsampling is applied to all pictures, so that the low resolution decoder can always have a picture to decode. The downsampled residual is transformed and quantized, and entropy coded. This forms the base layer bitstream. The inverse quantizer and inverse transform is applied, and then the coded residual is upsampled back to the full resolution. The encoder can choose whether or not to send an enhancement layer full resolution error signal for the picture or slice. In general, an enhancement layer full resolution error signal is coded for all I slices, and can be optionally sent for P and B slices based on the magnitude of the error signal when the full resolution input picture subtracts the decoded upsampled. If an enhancement layer full resolution error signal is to be coded, the coded base layer upsampled coded picture is subtracted from the input full resolution picture. The difference is then quantized, transformed and entropy coded to form the enhancement layer bitstream. The enhancement layer bitstream can be seen as containing only intra-coded slices.

In an alternative embodiment, a joint optimization of both the low resolution and full resolution pictures could take place. That would require addition of a full low resolution decoder model inside of the scalable encoder, and low resolution reference pictures stores, and an additional low resolution motion estimation block.

Any of several different upsampling and downsampling filters can be used, for example bilinear interpolation, zero order hold, or multi-tap filters.

Additional deblocking filters could be added in the full resolution decoder and the scalable encoder, prior to the addition of the enhancement layer error signal. Deblocking could in this case also consider the enhancement layer macroblock modes used, i.e. if all affected blocks are skipped, no additional deblocking is applied, otherwise different strength filtering is applied depending on whether the upscaling was performed on the residual or the low resolution reconstructed block.

There is more than one possible method to use for intra prediction in the full resolution decoder, when applied to H.264/MPEG AVC. Intra-prediction could be applied at the low resolution, using the same prediction pixels as in the H.264/MPEG AVC spec. Alternatively, another method could be used, where the intra prediction is applied at the full resolution, and a larger number of pixels at the full resolution are used in the prediction.

In an alternative embodiment, the full resolution decoder may decide performing motion compensation for a macroblock using the same resolution and method as for the base layer decoding (i.e. using 16×16 macroblocks), which is then upsampled to full resolution. Upsampling could be performed using a bilinear or longer tap filter. A full resolution error signal could also be added, if available. The decision could be made through additional signaling at the macroblock level (i.e. with the presence of a RRU macroblock mode, and a low resolution macroblock mode, apart from SKIP mode). This process may be desirable for certain cases where, due to high motion and texture detail, upsampling the residual would lead to the generation of undesirable high frequencies and artifacts. Nevertheless, this would also require that the full resolution decoder is able to store, or on the fly generate, the low resolution references. The longer tap filter could also incur further complexity, which is although partly compensated from the fact that motion compensation is performed for a smaller macroblock. A second, simpler alternative solution to the same problem however is to perform motion compensation at full resolution, entropy decode and inverse quantize and inverse transform the base layer residual but not add it to the motion compensated signal, prior to finally adding the full resolution error. This method requires decoding of the base layer residual in order to update the entropy context model for the decoding of the remaining residuals. This later solution could replace the low resolution macroblock mode, or co-exist as an additional mode for the encoding of the full resolution residual.

The above description and figures assume two layers of scalability, however, this concept can be extended to an arbitrary number of layers.

Figure 12:
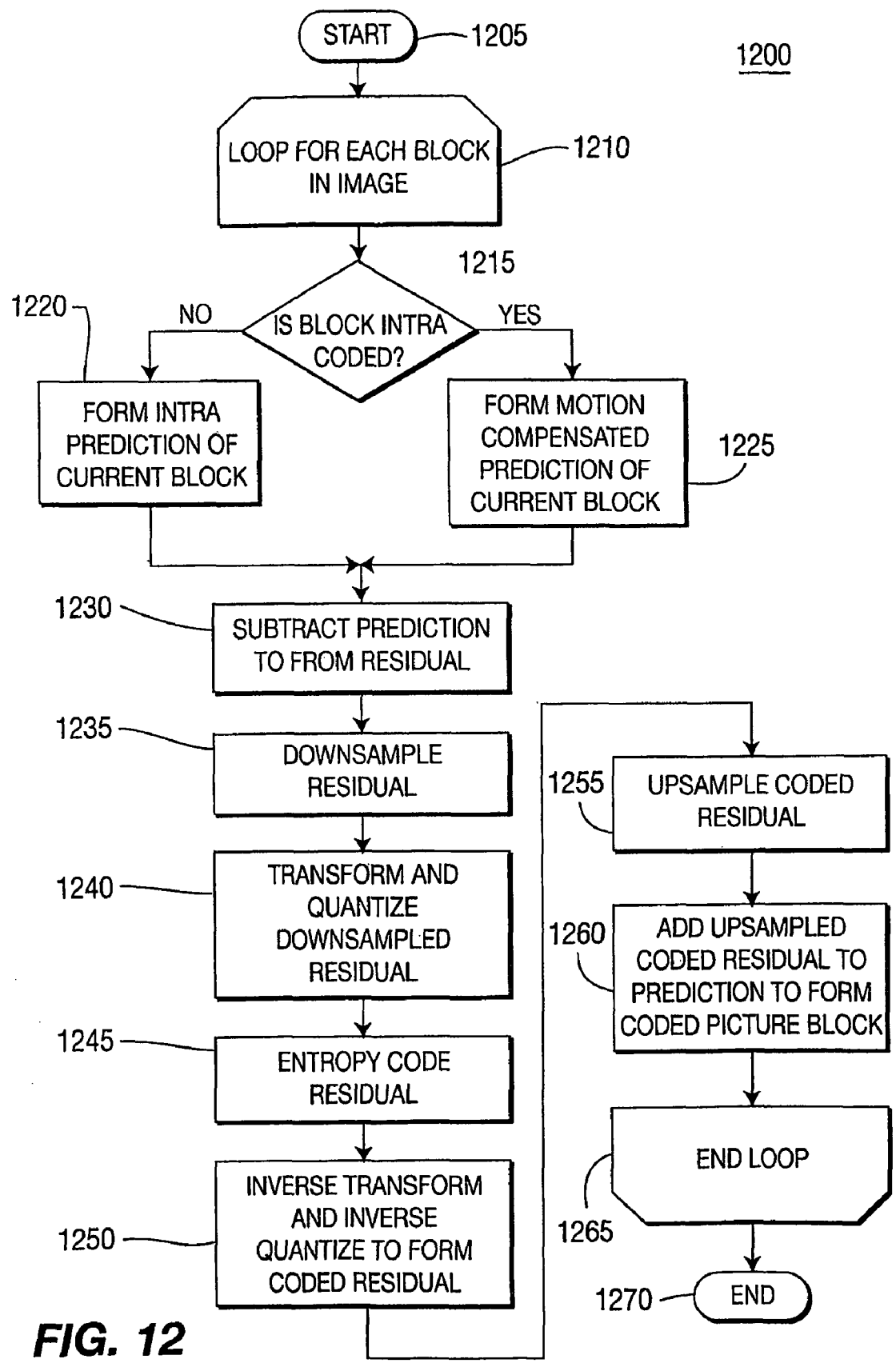
FIG. 12 shows a flow diagram for a video encoding process in accordance with the principles of the present invention.

Turning to FIG. 12, a video encoding process is indicated generally by the reference numeral 1200. The process includes a start block 1205 that passes control to a loop limit block 1210. The loop limit block 1210 passes control to a decision block 1215, which determines whether or not a current input block is intra coded. If the current input block is not intra coded, then control passes to a function block 1220 that forms an intra prediction of the current input block, and then passes control to a function block 1230. Otherwise, if the current input block is intra coded, then control passes to a function block 1225 that forms a motion compensated prediction of the current input block, and then passes control to the function block 1230. The function block 1230 subtracts the prediction of the current input block from the current input block to form a prediction residual, and then passes control to a function block 1235. The function block 1235 downsamples the prediction residual, and then passes control to a function block 1240. The function block 1240 transforms and quantizes the downsampled prediction residual, and then passes control to a function block 1245. The function block 1245 entropy codes the prediction residual, and then passes control to a function block 1250. The function block 1250 inverse transforms and inverse quantizes the prediction residual to form a coded prediction residual, and then passes control to a function block 1255. The function block 1255 upsamples the coded prediction residual to form an upsampled coded prediction residual, and then passes control to a function block 1260. The function block 1260 adds the upsampled coded prediction residual to the prediction for the current input block to form a coded picture block, and then passes control to a loop limit block 1265. The loop limit block passes control to an end block 1270.

Figure 13:
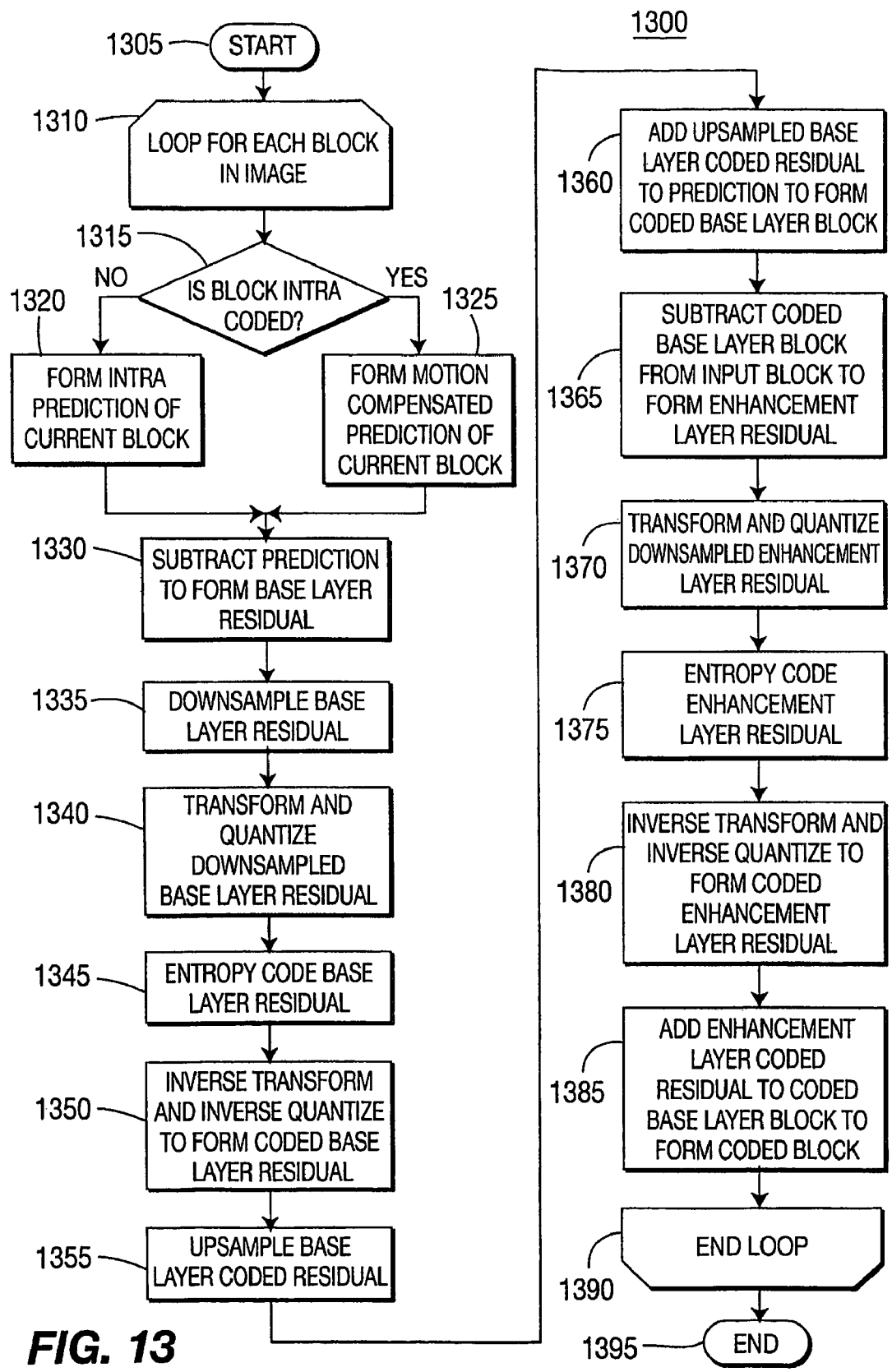
FIG. 13 shows a flow diagram for a video encoding process with spatial scalability in accordance with the principles of the present invention.

Turning to FIG. 13, a video encoding process with spatial scalability is indicated generally by the reference numeral 1300. The process includes a start block 1305 that passes control to a loop limit block 1310. The loop limit block 1310 passes control to a decision block 1315, which determines whether or not a current input block is intra coded. If the current input block is not intra coded, then control passes to a function block 1320 that forms an intra prediction of the current input block, and then passes control to a function block 1330. Otherwise, if the current input block is intra coded, then control passes to a function block 1325 that forms a motion compensated prediction of the current input block, and then passes control to the function block 1330. The function block 1330 subtracts the prediction of the current input block from the current input block to form a base layer prediction residual, and then passes control to a function block 1335. The function block 1335 downsamples the base layer prediction residual, and then passes control to a function block 1340. The function block 1340 transforms and quantizes the downsampled base layer prediction residual, and then passes control to a function block 1345. The function block 1345 entropy codes the base layer prediction residual, and then passes control to a function block 1350. The function block 1350 inverse transforms and inverse quantizes the prediction residual to form a coded base layer prediction residual, and then passes control to a function block 1355. The function block 1355 upsamples the coded base layer prediction residual to form an upsampled coded base layer prediction residual, and then passes control to a function block 1360. The function block 1360 adds the upsampled coded prediction residual to the prediction for the current input block to form a coded base layer block, and then passes control to a function block 1365. The function block 1365 subtracts the coded base layer block from the current input block to form an enhanced layer prediction residual, and then passes control to a function block 1370. The function block 1370 transforms and quantizes the downsampled enhanced layer prediction residual, and then passes control to a function block 1375. The function block 1375 entropy codes the enhanced layer prediction residual, and then passes control to a function block 1380. The function block 1380 inverse transforms and inverse quantizes the enhanced layer prediction residual to form a coded enhanced layer prediction residual, and then passes control to a function block 1385. The function block 1385 adds the coded enhanced layer block, and then passes control to a loop limit block 1390. The loop limit block 1390 passes control to an end block 1395.

Turning to FIG. 14, a high resolution video decoding process is indicated generally by the reference numeral 1400. The process includes a start block 1405 that passes control to a loop limit block 1410. The loop limit block 1410 passes control to a function block 1415, which entropy decodes a coded base layer prediction residual bitstream, and then passes control to a function block 1420. The function block 1420 inverse transforms and inverse quantizes the base layer prediction residual to form a coded base layer prediction residual, and then passes control to a function block 1425. The function block 1425 upsamples the coded base layer prediction residual to form an upsampled coded base layer prediction residual, and then passes control to a decision block 1430. The decision block 1430 determines whether or not a current input block is intra coded. If the current input block is not intra coded, then control passes to a function block 1435 that forms a high resolution motion compensated prediction of the current input block, and then passes control to a function block 1440. Otherwise, if the current input block is intra coded, then control passes to a function block 1445 that forms a high resolution intra prediction of the current input block, and then passes control to the function block 1440. The function block 1440 adds the upsampled coded prediction residual to the prediction of the current input block to form a coded picture block, and then passes control to a loop limit block 1450. The loop limit block 1450 passes control to an end block 1455.

Turning to FIG. 15, a low resolution video decoding process is indicated generally by the reference numeral 1500. The process includes a start block 1505 that passes control to a loop limit block 1510. The loop limit block 1510 passes control to a function block 1515, which entropy decodes a coded base layer prediction residual bitstream, and then passes control to a function block 1520. The function block 1520 inverse transforms and inverse quantizes the base layer prediction residual to form a coded base layer prediction residual, and then passes control to a decision block 1525. The decision block 1525 determines whether or not a current input block is intra coded. If the current input block is not intra coded, then control passes to a function block 1530 that scales a motion vector for the current input block, and then passes control to a function block 1535. Otherwise, if the current input block is intra coded, then control passes to a function block 1540 that forms a low resolution intra prediction of the current input block, and then passes control to the function block 1545. The function block 1535 forms a low resolution motion compensated prediction of the current input block, and then passes control to the function block 1545. The function block 1545 adds the coded prediction residual to the prediction of the current input block to form a coded picture block, and then passes control to a loop limit block 1550. The loop limit block 1550 passes control to an end block 1555.

Figure 16:
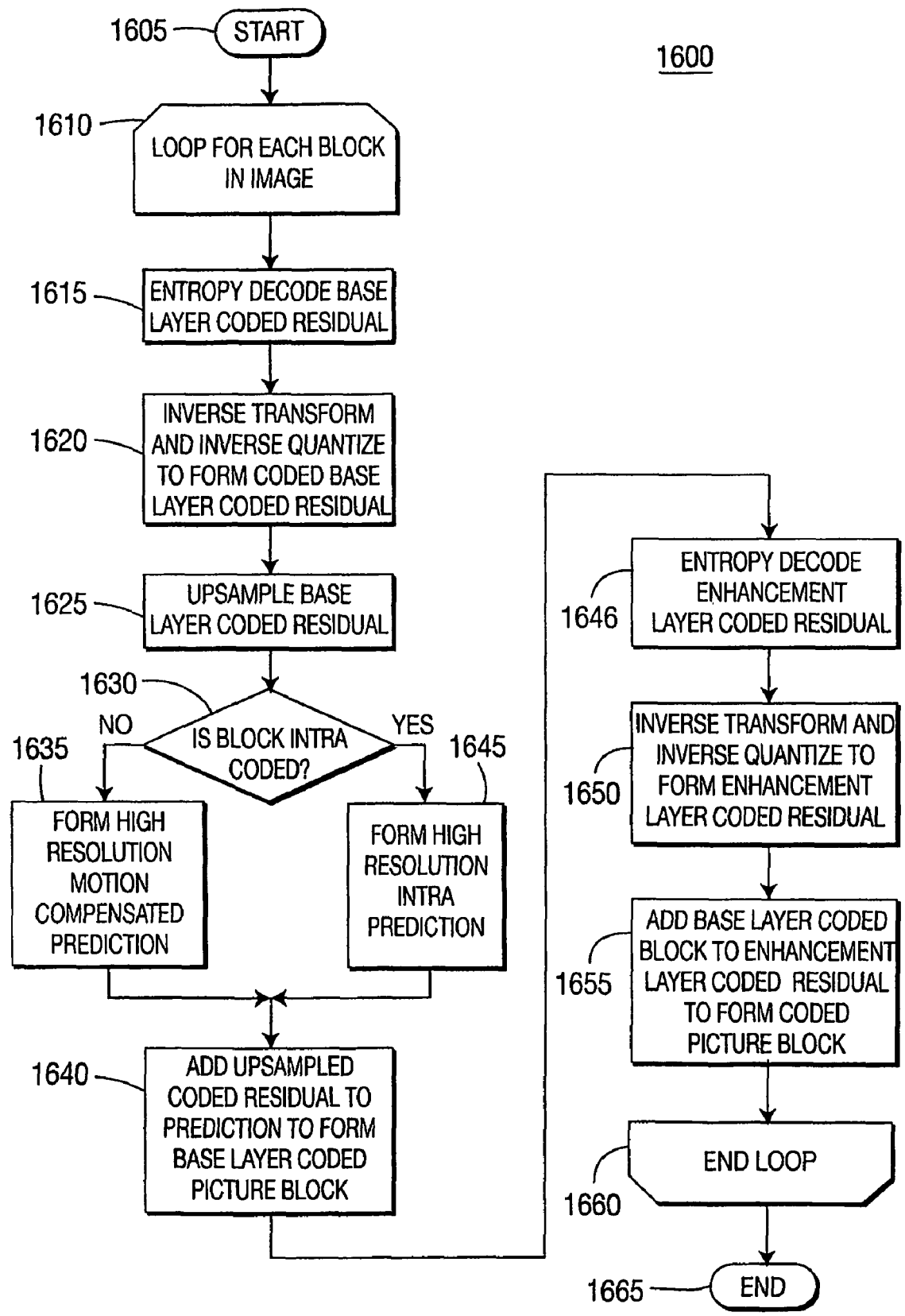
FIG. 16 shows a flow diagram for a high resolution video decoding process with spatial scalability in accordance with the principles of the present invention.

Turning to FIG. 16, a high resolution video decoding process with spatial scalability is indicated generally by the reference numeral 1600. The process includes a start block 1605 that passes control to a loop limit block 1610. The loop limit block 1610 passes control to a function block 1615, which entropy decodes a coded base layer prediction residual bitstream, and then passes control to a function block 1620. The function block 1620 inverse transforms and inverse quantizes the base layer prediction residual to form a coded base layer prediction residual, and then passes control to a function block 1625. The function block 1625 upsamples the coded base layer prediction residual to form an upsampled coded base layer prediction residual, and then passes control to a decision block 1630. The decision block 1630 determines whether or not a current input block is intra coded. If the current input block is not intra coded, then control passes to a function block 1635 that forms a high resolution motion compensated prediction of the current input block, and then passes control to a function block 1640. Otherwise, if the current input block is intra coded, then control passes to a function block 1645 that forms a high resolution intra prediction of the current input block, and then passes control to the function block 1640. The function block 1640 adds the upsampled coded prediction residual to the prediction of the current input block to form a coded picture block, and then passes control to a function block 1646. The function block 1646 entropy decodes a full resolution coded enhanced layer prediction residual bitstream, and then passes control to a function block 1650. The function block 1650 inverse transforms and inverse quantizes the full resolution enhancement layer prediction residual to form a full resolution coded enhancement layer prediction residual, and then passes control to a function block 1655. The function block 1655 adds the coded base layer picture block to the full resolution coded enhancement layer prediction residual to form a coded picture block, and then passes control to a loop limit block 1660. The loop limit block 1660 passes control to an end block 1665.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A spatial scalable video encoder for encoding an image block, comprising:
   a motion compensator for forming a motion compensated full resolution prediction;
   a subtractor, in signal communication with said motion compensator, for subtracting the motion compensated full resolution prediction from the image block to form a prediction residual;
   a downsampler, in signal communication with said subtractor, for downsampling the prediction residual to form a low resolution downsampled prediction residual;
   a transformer/quantizer, in signal communication with said downsampler, for coding the low resolution downsampled prediction residual;
   an inverse quantizer/inverse transformer, in signal communication with said transformer/quantizer, for inverse quantizing and inverse transforming the coded low resolution downsampled prediction residual to form a coded prediction residual;
   an upsampler, in signal communication with said inverse quantizer/inverse transformer, for upsampling the coded prediction residual to form a coded upsampled prediction residual;
   an adder, in signal communication with said upsampler, for adding the upsampled prediction residual to a motion compensated full resolution prediction to form a sum signal;
   a subtractor, in signal communication with said adder, for subtracting the sum signal from the image block to form a difference signal; and
   another quantizer/transformer, in signal communication with said subtractor, for forming a full resolution enhancement layer error signal from the difference signal.

2. The spatial scalable video encoder of claim 1, further comprising:
   an entropy coder, in signal communication with said quantizer/transformer, for encoding the coded low resolution downsampled prediction residual into a base layer bitstream; and
   another entropy coder, in signal communication with said another quantizer/transformer, for encoding the full resolution enhancement layer error signal into an enhancement layer bitstream.

3. The spatial scalable video encoder of claim 2, wherein the enhancement layer bitstream is encoded only for intra-coded slices in the base layer bitstream.

4. A method for encoding an image block, comprising the steps of:
   forming a motion compensated full resolution prediction;
   subtracting the motion compensated full resolution prediction from the image block to form a prediction residual;
   downsampling the prediction residual to form a low resolution downsampled prediction residual;
   coding the low resolution downsampled prediction residual to form a coded low resolution downsampled prediction residual;
   inverse quantizing and inverse transforming the coded low resolution downsampled prediction residual to form a coded prediction residual;
   upsampling the coded prediction residual to form a coded upsampled prediction residual;
   adding the coded upsampled prediction residual to a motion compensated full resolution prediction to form a sum signal;
   subtracting the sum signal from the image block to form a difference signal; and
   quantizing and transforming the difference signal to form a full resolution enhancement layer error signal.

5. The method of claim 4, further comprising the steps of:
   encoding the coded low resolution downsampled prediction residual into a base layer bitstream; and
   encoding the full resolution enhancement layer error signal into an enhancement layer bitstream.

6. The method of claim 5, wherein the enhancement layer bitstream is encoded only for intra-coded slices in the base layer bitstream.

* * * * *